(12) United States Patent
Lin et al.

(10) Patent No.: US 6,628,709 B2
(45) Date of Patent: Sep. 30, 2003

(54) BIT NUMBER PREDICTION FOR VLC CODED DCT COEFFICIENTS AND ITS APPLICATION IN DV ENCODING/TRANSCODING

(75) Inventors: Wanrong Lin, Plainsboro, NJ (US); Dennis Bushmitch, Somerset, NJ (US)

(73) Assignee: Matsushita Electric Corporation of America, Secaucus, NJ (US)

( * ) Notice: Subject to any disclaimer, the term of this patent is extended or adjusted under 35 U.S.C. 154(b) by 452 days.

(21) Appl. No.: 09/742,535

(22) Filed: Dec. 21, 2000

(65) Prior Publication Data

US 2002/0150157 A1 Oct. 17, 2002

(51) Int. Cl.[7] .................................................. H04N 7/12
(52) U.S. Cl. ............................ 375/240.03; 375/240.24; 348/425.3
(58) Field of Search .................. 375/240.02, 240.03, 375/240.18, 240.2, 240.23, 240.24, 240.26; 348/420.1, 425.3, 426.1, 441, 445; 382/245–246, 248, 250–251; 709/247

(56) References Cited

U.S. PATENT DOCUMENTS

| | | | | |
|---|---|---|---|---|
| 5,260,808 A | * | 11/1993 | Fujii | ........................... 382/166 |
| 6,259,741 B1 | * | 7/2001 | Chen et al. | ............ 375/240.26 |
| 6,421,385 B1 | * | 7/2002 | Uenoyama et al. | ...... 370/240.2 |
| 6,434,197 B1 | * | 8/2002 | Wang et al. | ........... 375/240.29 |
| 6,463,445 B1 | * | 10/2002 | Suzuki et al. | ................ 707/200 |
| 6,483,876 B1 | * | 11/2002 | Chang et al. | .......... 375/240.16 |
| 6,490,627 B1 | * | 12/2002 | Kalra et al. | .................. 709/231 |
| 6,549,577 B2 | * | 4/2003 | Florencio et al. | ...... 375/240.21 |
| 2002/0157112 A1 | * | 10/2002 | Kuhn | ......................... 725/113 |
| 2002/0176506 A1 | * | 11/2002 | Florencio et al. | ...... 375/240.25 |
| 2002/0181794 A1 | * | 12/2002 | Lee | ............................. 382/250 |

OTHER PUBLICATIONS

Hsu et al., "Digital TV video format conversion by extendible inverse DCT", IEEE ISCE'97, pp. 206–209, Dec. 1997.*

Li et al., "An arbitrary ratio resizer for MPEG applications", IEEE ICCE 2000, pp. 54–55, Jun. 2000.*

* cited by examiner

Primary Examiner—Vu Le
(74) Attorney, Agent, or Firm—RatnerPrestia (57) ABSTRACT

A simple and efficient scheme is used to predict the number of bits needed to block of discrete cosine transform (DCT) coefficients with variable length coding (VLC). The scheme defines an easily computable parameter that has a strong correlation with the number of bits needed to encode the DCT data. Then a second order polynomial is developed to approximate the correlation and is used to predict the number of VLC bits that will be produced if a corresponding quantization matrix is used. The approach can be used to streamline the encoding/transcoding process for DV, and the result on that is presented. A further feature is the ability to present multiple results for multiple quantization matrixes.

28 Claims, 11 Drawing Sheets

BIT NUMBER PREDICTION FOR VLC CODED DCT COEFFICIENTS AND ITS APPLICATION IN DV ENCODING/ TRANSCODING

DESCRIPTION OF RELATED ART

1. Field of the Invention

This invention relates to video formatting and the like. More specifically the invention relates to efficient conversion between transmission or storage formats and editing formats. The invention is particularly focused on conversion between DV and MPEG formatting.

2. Background of the Invention

DV is an SMPTE (Society of Motion Picture and Television Engineers) standardized digital video format targeted at acquisition and editing of professional quality video. A number of equipment vendors have adopted DV in their digital video products. Because MPEG is another popular digital video format standardized by ISO (International Standardization Organization), the industry has been making an effort to promote the interoperability between DV and MPEG by developing a software-only real-time transcoder between those two formats. A fundamental problem with transcoding between the DV and MPEG formats is bit number prediction. This typically arises in I frame-based MPEG2 to DV transcoder development as well as in DV encoding process generally.

In both DV and MPEG, video image data is compressed by transforming it into the frequency domain, using a discrete cosine transform (DCT), and by variable length coding (VLC) the transformed data. To best serve its target applications, DV is a DCT/VLC-based, I-frame only fixed frame-length format. To best serve tape recording replaying and to provide synchronized transmission, each frame is further broken down into many "segments", each consisting of five "macroblocks". The DV macroblocks are similar to MPEG macroblocks, with several exceptions, including that DV each segment has a fixed bit length while there is no such constraint in MPEG. Because adjacent macroblocks have strong correlation and usually have similar coding complexity, the positions of the five macroblocks in each segment are sparsely scattered in the frame according to a pseudo-random deterministic pattern. This reduces the possibility of "bit overflow" or "bit vacancy," Which would likely occur if the five macroblocks of a segment were close to each other and had similar complexity. This patterning of the macroblocks would produce either a large number of bits or very few bits in each segment.

Because each DV segment has a fixed bit budget, if the coding process produces more bits than a segment can accommodate, some high frequency DCT coefficients will be discarded. To control the number of bits produced, each macroblock is assigned a quantization number. Quantization numbers fall in the range of 0–15, with 15 corresponding to the finest quantizer and 0 to the coarsest. The quantization number is the index of the pre-determined 8×8 "quantization matrices." These matrices consist of the quantization steps for each DCT coefficient.

A fundamental problem faced in the encoding/transcoding process is how to achieve the best picture quality given the fixed bit space assigned to each segment. Naturally it would be preferable to fully utilize this bit budget, as any unused bit space can not be used by other segments and, thus, is wasted. It is not proper, however, to use always the finest quantizer and produce the greatest number of bits, even though with this strategy there will not be any wasted bit space. If all the VLC bits can fit in the budget with the finest quantizer (quantization number=15) then that is the optimal solution; otherwise, there are two directions to go to within the range of all possible quantizers. The two directions are either (1) to choose a finer quantizer and discard high frequency bits that can not fit in, or (2) to choose a coarser quantizer to fit in high frequency bits at the expense of increasing the quantization error of the lower frequency coefficients.

Currently the solution to the above problem that has been adopted by the majority of DV encoders in the industry is to select the quantization numbers, which just fit in all the bits into the given space. Any finer quantizer will cause the coefficients to be discarded. Experiments prove that this scheme produces better picture quality than simply using the finest quantizer at all times, although it can be shown that this solution is still not optimal.

At present the criterion for selecting a quantization number is based on the fixed space criterion. The non-optimality of the prior art criteria for quantization table selection is the result of the use of a fixed space for all bits. The selected quantization number N should be such that, with quantization number N all the bits can fit in the fixed space, but with quantization of N+1 (if N is not the maximum possible number 15, which corresponds to the finest quantizer), there will be some overflow bits. This criterion is referred to as the "best fit" criterion.

The best fit criterion does not necessarily produce the best picture quality given the fixed bit space. Without the loss of generality, suppose that just one DCT block is to be coded, given the bit space according to the "best fit" criterion. In this example, all of the AC coefficients for the DCT can be written in a line according to their scan order. In this representation the first line is the coefficient index, the second line is the coefficient values and the third line is the area number.

TABLE 1

| 1 | 2 | 3 | ... | 8 | ... | 23 | ... | 45 | ... | 62 | 63 |
|---|---|---|---|---|---|---|---|---|---|---|---|
| C1 | C2 | C3 | ... | C8 | ... | C23 | ... | C45 | ... | C62 | C63 |
| | 0 | | | 1 | | 2 | | | | 3 | |

Suppose we have the following specific DCT block with coefficient values of 1 for coefficients 45 and 62.

TABLE 2

| 1 | 2 | 3 | ... | 8 | ... | 23 | ... | 45 | ... | 62 | 63 |
|---|---|---|---|---|---|---|---|---|---|---|---|
| C1 | C2 | C3 | ... | C8 | ... | C23 | ... | 1 | 0 | 1 | 0 |
| | 0 | | | 1 | | 2 | | | | 3 | |

If with quantization number QN equals M, the quantization step for area 3 is 1 and a coefficient 62 must be discarded because of the limited space. But if QN is M−1, the quantization step for the area becomes 2 (the quantization steps for other areas are unchanged) and all the bits can fit in the space allocated. According to the "best fit" criterion, therefore, QN should be M−1. Because of the larger step size when QN is M−1, both coefficient 45 and 62 become zero and are effectively discarded. When the quantization number M chosen, however, coefficient 45 in still encoded although coefficient 62 is not. Clearly QN equal to M does better than M−1 and "best fit" criterion does not provide the best possible result for this block.

The typical method used to find the "best fit" quantizer, is to try all the candidates one by one, beginning with the finest quantizer, until all of the quantized bits fit into the allotted space. Each try requires a quantization, a run-length scan and many VLC table look-ups to determine the number of bits that are going to be produced from the VLC stage. Given that each frame has hundreds of segments and assuming a frame rate of 30 frames/second, this brute force approach becomes a bottleneck for a real-time software implementation, or a bulky part in a hardware implementation of the encoder.

The DV standard and consists of two sub-standards: DV25 and DV50. DV25 is a 4:1:1 format for semi-professional quality video while DV50 is a 4:2:2 format for professional, studio quality video. The industry has also developed DVHD format for the HDTV applications, based on the DV standard. The bit rates for this standard are 25 Mbps, 50 Mbps and 100 Mbps (DVHD) respectively. These formats are very similar to each other and can be understood through a description of DV50.

Figure 1:
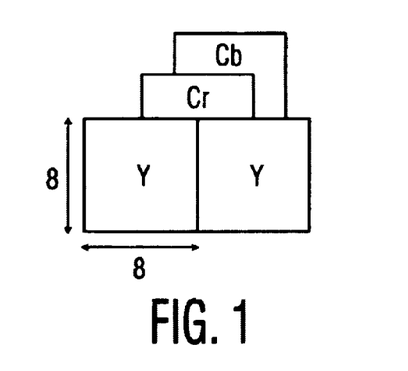
FIG. 1 is a diagram of DCT blocks in a macroblock of a DV50 frame.

As in many video standards, in DV50 each frame is divided into 8×8 DCT blocks and every four DCT blocks (2 luminance 8×8 DCT blocks and two chrominance 8×8 DCT blocks) constitute a macroblock in the pattern illustrated in FIG. 1.

There are two DCT modes in DV; 88-DCT and 248-DCT. 88-DCT is just the regular 8×8 DCT, which is also used in MPEG in a "frame DCT" mode. The 248-DCT is intended to code those DCT blocks with relatively large "intra-frame" motion, that is to say, motion between the two interlaced fields that make up a video frame. This mode still uses an 8×8 DCT block, but each block consists of two 4×8 DCT transforms of two sub blocks derived from the two fields.

As described above, DV50 is an I-frame only coding standard in which the smallest independent coding unit is a segment consisting of 5 macroblocks positioned sparsely according to a deterministic pattern. This spreading of the blocks allows for the efficient use of fixed bit space allocated for each segment.

Although there is a pattern according to which the bits of the five macroblocks are distributed, essentially there is no further limitation on the bit space for each macroblock within a segment. All bits share the fixed bit space assigned to a segment, which is 2560 bits for all AC coefficients, excluding the EOB (End of Block) bits. The constraint is that the sum of the coded bits of the five macroblocks should not exceed the segment's limit; otherwise some bits must be discarded.

Each DCT coefficient is multiplied by a predetermined weighting number, after the DCT transform stage and weighting each DCT block goes through two steps before it is run-length coded: (1) classification and (2) quantization. Based on some overall characteristics of the coefficients of a DCT block, a class number of 0–3 is selected. If the DCT block falls into class 3, its AC coefficients are divided by two, shifted right by one bit. This is called "scaling". Essentially, both of the operations above can be viewed as a part of the quantization process, but it is preferred to follow the terms in the standard.

Figure 2A:
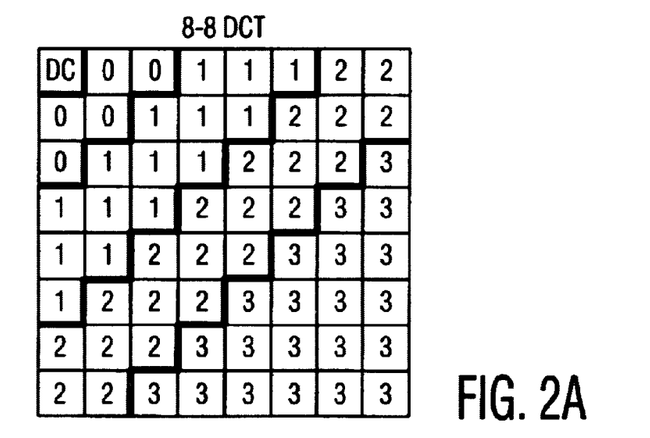
FIGS. 2A and 2B are diagrams depicting each DCT block divided into four areas according to a predetermined pattern in the prior art.
Figure 2B:
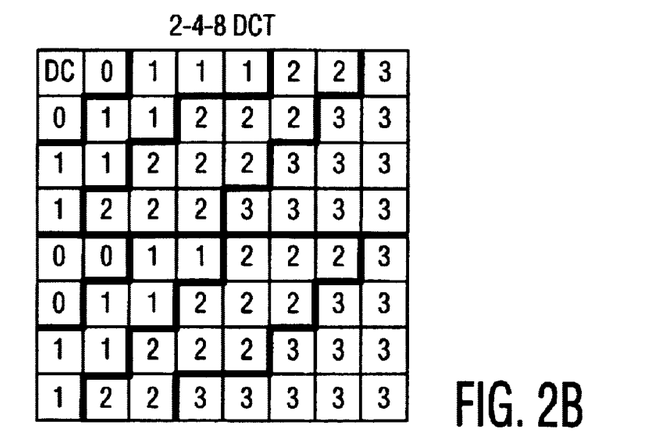

The next step is to choose the quantization number (QNO), which determines quantization matrix to be used. The quantization matrix specifies the quantization step in use for each of the 64 coefficients in the DCT block. Instead of giving the quantization step for each coefficient explicitly, each DCT block is divided into 4 areas according to a predetermined pattern, as shown in FIG. 2. This pattern is different for 88-DCT and 248-DCT. The quantization step is the same for each area. Table 1 shows the quantization step for each area, for different classes and quantization table numbers. By way of example, for a coefficient in area "2", given the class number "1" and the quantization table number "10", the quantization size step is then determined as follows. In table 3, we locate the quantization number "10" in the column corresponding to class "1" and denote the row in which "10" resides as "row X". Then we find the column corresponding to area "2" and denote that column as "column Y". The number (here it is "2") in row X and column Y is the desired quantization step.

TABLE 3

Quantization Table

| | Class Number | | | | Area Number | | | |
|---|---|---|---|---|---|---|---|---|
| | 0 | 1 | 2 | 3 | 0 | 1 | 2 | 3 |
| Quantization | 15 | | | | 1 | 1 | 1 | 1 |
| Number | 14 | | | | 1 | 1 | 1 | 1 |
| * | 13 | | | | 1 | 1 | 1 | 1 |
| | 12 | 15 | | | 1 | 1 | 1 | 1 |
| | 11 | 14 | | | 1 | 1 | 1 | 1 |
| | 10 | 13 | | 15 | 1 | 1 | 1 | 1 |
| | 9 | 12 | 15 | 14 | 1 | 1 | 1 | 1 |
| | 8 | 11 | 14 | 13 | 1 | 1 | 1 | 2 |
| | 7 | 10 | 13 | 12 | 1 | 1 | 2 | 2 |
| | 6 | 9 | 12 | 11 | 1 | 1 | 2 | 2 |
| | 5 | 8 | 11 | 10 | 1 | 2 | 2 | 4 |
| | 4 | 7 | 10 | 9 | 1 | 2 | 2 | 4 |
| | 3 | 6 | 9 | 8 | 2 | 2 | 4 | 4 |
| | 2 | 5 | 8 | 7 | 2 | 2 | 4 | 4 |
| | 1 | 4 | 7 | 6 | 2 | 4 | 4 | 8 |
| | 0 | 3 | 6 | 5 | 2 | 4 | 4 | 8 |
| | | 2 | 5 | 4 | 4 | 4 | 8 | 8 |
| | | 1 | 4 | 3 | 4 | 4 | 8 | 8 |
| | | 0 | 3 | 2 | 4 | 8 | 8 | 16 |
| | | | 2 | 1 | 4 | 8 | 8 | 16 |
| | | | 1 | 0 | 8 | 8 | 16 | 16 |
| | | | 0 | | 8 | 8 | 16 | 16 |

Even though there are 16 quantization numbers, there are only 9 distinctive quantization matrices. These are identified by the quantization matrix number (QMN).

TABLE 4

Quantization Matrix Table

| | Area Number | | | |
|---|---|---|---|---|
| QMN | 0 | 1 | 2 | 3 |
| 8 | 1 | 1 | 1 | 1 |
| 7 | 1 | 1 | 1 | 2 |
| 6 | 1 | 1 | 2 | 2 |
| 5 | 1 | 2 | 2 | 4 |
| 4 | 2 | 2 | 4 | 4 |
| 3 | 2 | 4 | 4 | 8 |
| 2 | 4 | 4 | 8 | 8 |
| 1 | 4 | 8 | 8 | 16 |
| 0 | 8 | 8 | 16 | 16 |

The DC coefficient (coefficient index 0) does not belong to any area. It is coded with a fixed number of bits after the weighting.

Not every DCT block is assigned a separate quantization number. Instead, each macroblock has a quantization number. All four DCT blocks in that macroblock share that quantization number. Therefore, each DCT block has its own class number and a common quantization number, shared with other DCT blocks in the same macroblock. Thus for a segment, five quantization numbers are to be determined.

After the quantization, a scan is performed on each DCT block to convert the two-dimension 8 by 8 matrix into a one-dimension vector with 64 coefficients. The scan process also determines the (run, amplitude) combinations. "Run" is the number of consecutive zero coefficients that are scanned before a non-zero coefficient is encountered. "Amplitude" is the value of that non-zero coefficient. A quantized DCT block can be represented by a number of (run, amplitude) combinations, which is called "run-length" coding.

Finally, the (run, amplitude) combinations are coded into binary bits with a VLC table, which assigns prefix-free, variable length binary code words to those combinations.

Figure 3:
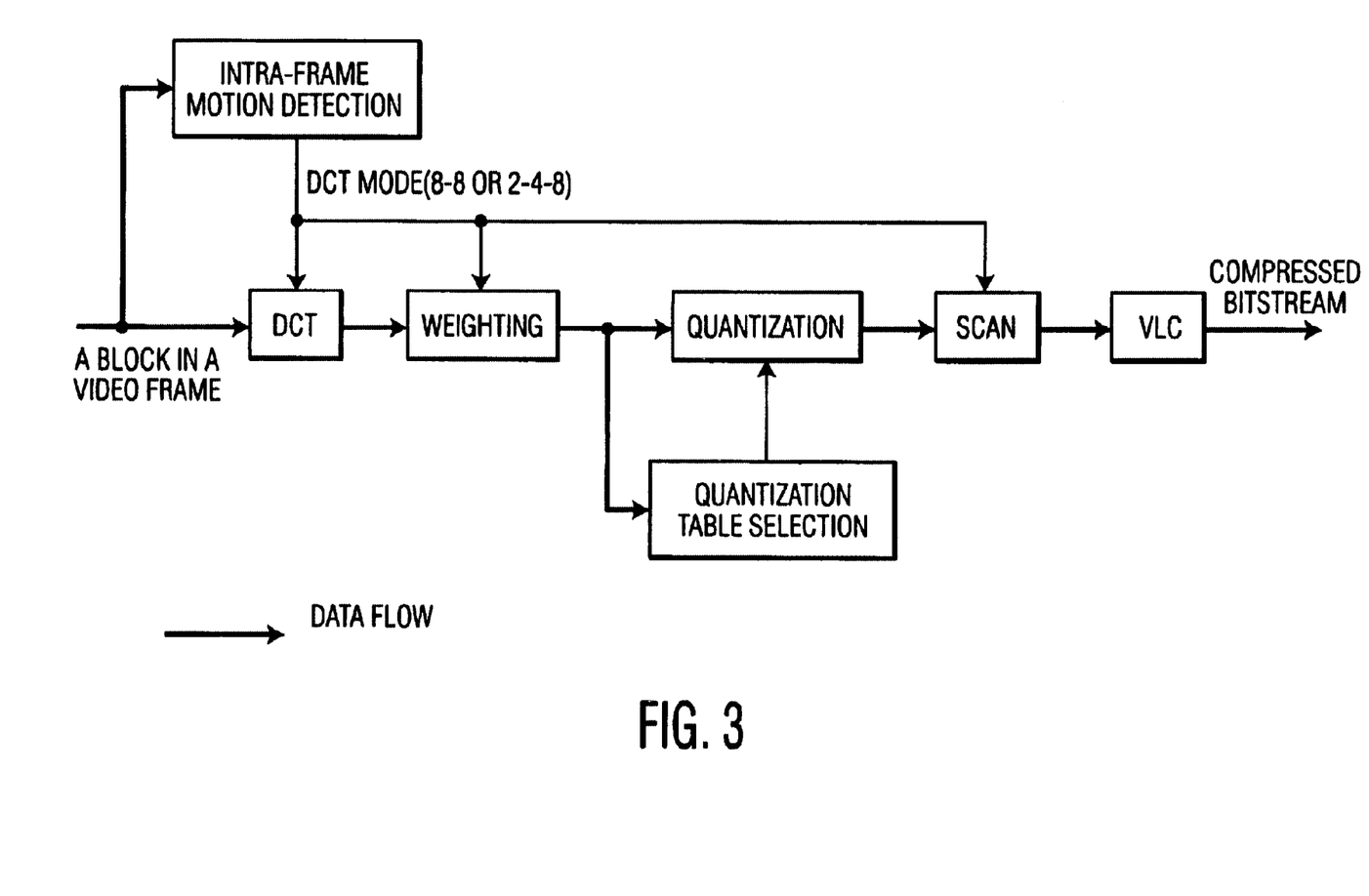
FIG. 3 is a diagram showing a DV encoding process, including a quantization table selection.
Figure 4:
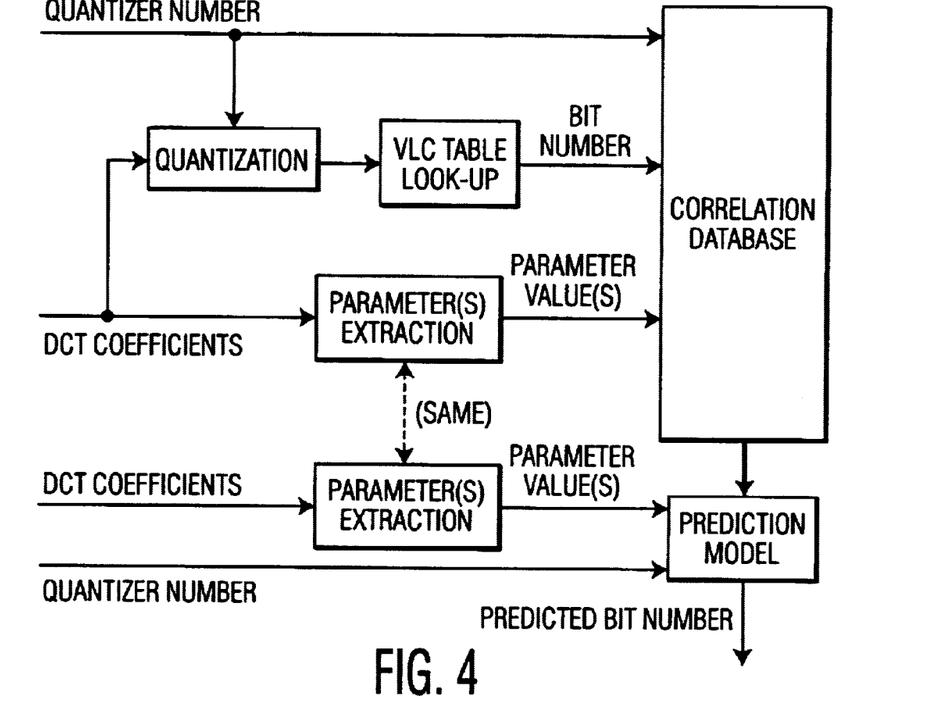
FIG. 4 is a block diagram-type flow chart showing a heuristic approach to obtaining a prediction model.

The entire DV encoding process is illustrated by FIG. 3, including the quantization table selection. The quantization selection table is a focus of the present invention.

One prior art scheme is used in industrial encoders. The quantization selection process within an industrial DV encoder is carried out in two stages: uniform quantization number selection, and fine adjustment.

In the uniform quantization number selection stage, the candidate quantizer sets all five quantization numbers for the five macroblock in a segment with one single number. The process can be described as following (TQNO: tentative quantization number; QNOi: the quantization number for the ith macroblock in the segment. i=1,2,3,4,5):

1. TQNO=15 (finest quantizer)
2. if TQNO equals to zero, QNOi=TQNO (i=1,2,3,4,5), exit;
3. Quantize all DCT blocks (20 of them) with QNOi=TQNO (i=1,2,3,4,5)
4. Run-length scan and VLC codeword length lookup
5. If all the bits can fit in the fixed space, or TQNO equals to zero, exit.
6. TQNO=TQNO-1
7. Goto 2

After the uniform quantization number selection, stage all macroblocks in a segment have the same quantization number. The fine adjustment procedure is intended to fully use the bit space:

1. i=1;
2. if QNOi is less than 15, increase QNOi by 1; otherwise goto 5
3. Redo the quantization, run-length scan and VLC codebook look up for macroblock i;
4. If all the bits can not fit in the fixed space, restore QNOi to its previous value (decreased by 1).
5. Increase i by 1. If i is greater than 5, exit;
6. Goto 2;

This implementation assumes that the finest quantizer which can fit all the bits in is the "optimal" quantizer.

That scheme is basically an exhaustive search approach. Each search virtually goes through the whole coding process, except that in the VLC table look up, only the code lengths are needed and no real bits are generated. This may not bring savings in complexity after the quantizer selection is finished, because, in order to produce the coded data, the coding process that was used to select the quantizer must be repeated. That means one or more "test codings" as well as the actual coding are carried out to code each segment. This is computationally intensive, especially for complex pictures.

A second scheme incorporates two optimizations on the previous approach. First, it does not assume that the encoding of each segment starts from the finest quantizer. Instead, it selects the initial quantizer as the quantizer that was selected for the previous segment, which should have reasonable correlation with the segment next to it, the scheme makes the selection among the numbers around the previous quantization number. In addition, the proposed scheme uses the number of non-zero quantized coefficients to estimate whether one can fit in all the bits, instead of going through the whole coding process, though quantization is still needed. That estimation may not turn out to be robust, so an adaptive adjustment was added to monitor and correct any large deviation.

As can be seen, the quantization selection scheme used in industrial encoders is very computationally intensive. Their approach in suggests some optimizations on the first scheme, but with two major drawbacks; (1) every search still requires the quantization process, and (2) the adaptive adjustment offsets the effort to reduce of reducing the computational intensity by adding the extra complexity and introducing instability into the scheme.

SUMMARY OF THE INVENTION

According to the present invention, it is desired to present a scheme, which simplifies the quantizer selection process by predicting the VLC bit number, rather than computing the exact bit number. This scheme is used in the DV encoding module of the MPEG-to-DV software transcoder with performance very close to one of the brute force methods used in the industry today. The scheme reduces the computation complexity considerably and hence leads to more efficient hardware and software implementations.

According to the present invention, a bit number prediction method for VLC coded DCT blocks is developed, and based on that, a new scheme for selecting the quantization number in DV encoding/transcoding is developed.

According to the present invention, a heuristic-based approach is used to convert video data formatted according to a first protocol to video data formatted according to a second protocol. A set of parameters are first predicted and one of the parameters is set to a first initial value. New values are incrementally established for the parameter until a predetermined criterion for has been reached.

In the preferred embodiment of the invention, the first protocol contains variable frame size formatted video information, such as MPEG, and the second protocol contains fixed frame size formatted video information using a DV format.

According to a particular aspect of the invention, a variable length coded bit number is predicted for a video frame. The predicted variable length bit number is used to optimize quantization on a frame-by-frame basis, and a resultant variable length coded bit number is used to generate a DV rendition of the video frame.

According to one aspect of the present invention, a method for constructing a prediction model includes extracting an initial parameter P, setting the parameter to a full first initial value, and setting an initial incremental value. The method is used to converting variable frame size formatted video information to fixed frame size formatted video information. In each DCT block a new value of P, ($P_n$), is established as a function of the previously established value of P, ($P_p$). New values of P ($P_n$) are established until a predetermined criterion for incrementing has been reached.

According to a further aspect of the present invention, variable frame size formatted video information is converted to fixed frame size formatted video information. A quantizer number and a DCT coefficient for a correlation database are received and supplied to the correlation database. At least one parameter value is extracted from the DCT coefficient and provided to the correlation database. A correlation database is then output to a prediction model. The parameter is set to a full first initial value, and a new value of P, ($P_n$), is set for the DCT block based on the previously established value of P, ($P_p$).

The invention uses a parameter (P), which has a strong correlation with the number of bits that is needed to code the data. A second order polynomial is developed to approximate the correlation and used to predict the number of bits. In the quantization number selection process of DV encoding/transcoding, this prediction can be used to determine whether all the bits for a segment will fit in the limited space given a specific quantization number. This process replaces the method of performing the actual quantization, run-length scan and VLC code length look-up for each segment.

Currently the quantization number selection process is very computation intensive and done with a parallel hardware implementation in the Panasonic DV encoder. With this new scheme, the computation complexity of selecting the quantization number for DV encoding/transcribing is considerably reduced and picture quality is also improved. This innovation can either (1) lower the cost and power consumption in hardware implementation or (2) make a real-time software only MPEG to DV transcoder possible. The present invention attempts to eliminate both drawbacks in the prior art with a different heuristic-based approach.

According to the invention, some easily computable parameters are determined. The parameters that have a very strong correlation with the VLC bit number that is needed to code the data, and hence a relatively precise prediction model can be established given such correlation. The prediction model is desirably simple and does not require much computation power. The system is robust, which means no changes in the model are needed to adapt it to different video content. It is apparent that the number of the parameters should be as small as possible. More parameters imply more complex parameter prediction computation. Therefore, it is desirable to use just one such parameter.

Because it is not simple to build a model describing the VLC coding process, intuition and trial-and-fail method are implemented in the inventive approach according to a preferred embodiment. According to one aspect of the present invention, the VLC coding scheme assigns shorter codes to smaller run and amplitude. Based on that, several definitions of the parameter (P) are considered.

DETAILED DESCRIPTION OF THE PREFERRED EMBODIMENTS

To develop and test the inventive parameterized prediction approach two video clips were used. One is called "Demo", which consists of natural video scenes, including parts with and without fast motions. Another is a well-known clip entitled "Mobile Calendar".

Figure 5:
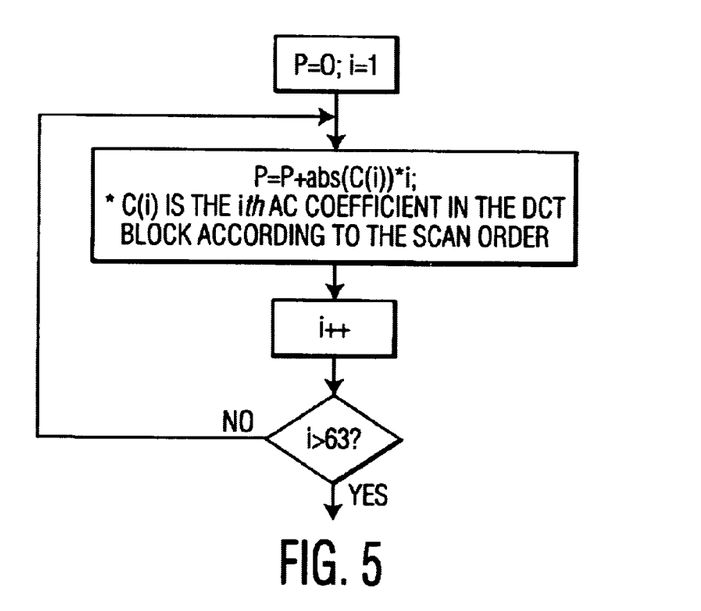
FIG. 5 is a flow chart indicating one approach to formulate the parameter P according to the present invention, using the equation P=P+abs (C(i)) i, where C(i) is the AC coefficient in the DCT block according to the scan order.

A first approach to formulate the parameter P, which has a strong correlation with the number of bits that is needed to code the data, is shown in FIG. 5. In the equation P=ΣP+abs (C(i))*i, where C(i) are the AC coefficients in the DCT block according to the scan order and quantized according to a particular quantization matrix. According to the present invention, the approach assumes that the greater the absolute values of the DCT coefficients are, or the more high frequency coefficients a DCT block has, the greater the number of bits are needed to code the data. Both the amplitude and the frequency of the coefficients are taken into account by multiplying the coefficients by their respective coefficient indexes, i.

For this calculation, and each of the alternate calculations described below, the particular quantization matrix that is used to generate the quantized coefficient values, the calculated quantization bit-size and the parameter P are stored in a database as an ordered triplet. Plots of the quantization bit-size versus the parameter P may be generated for each quantization matrix. Alternately, these values may be analyzed, as described below, to approximate the quantization bit size values as a function of the parameter P for each quantization matrix.

Figure 6:
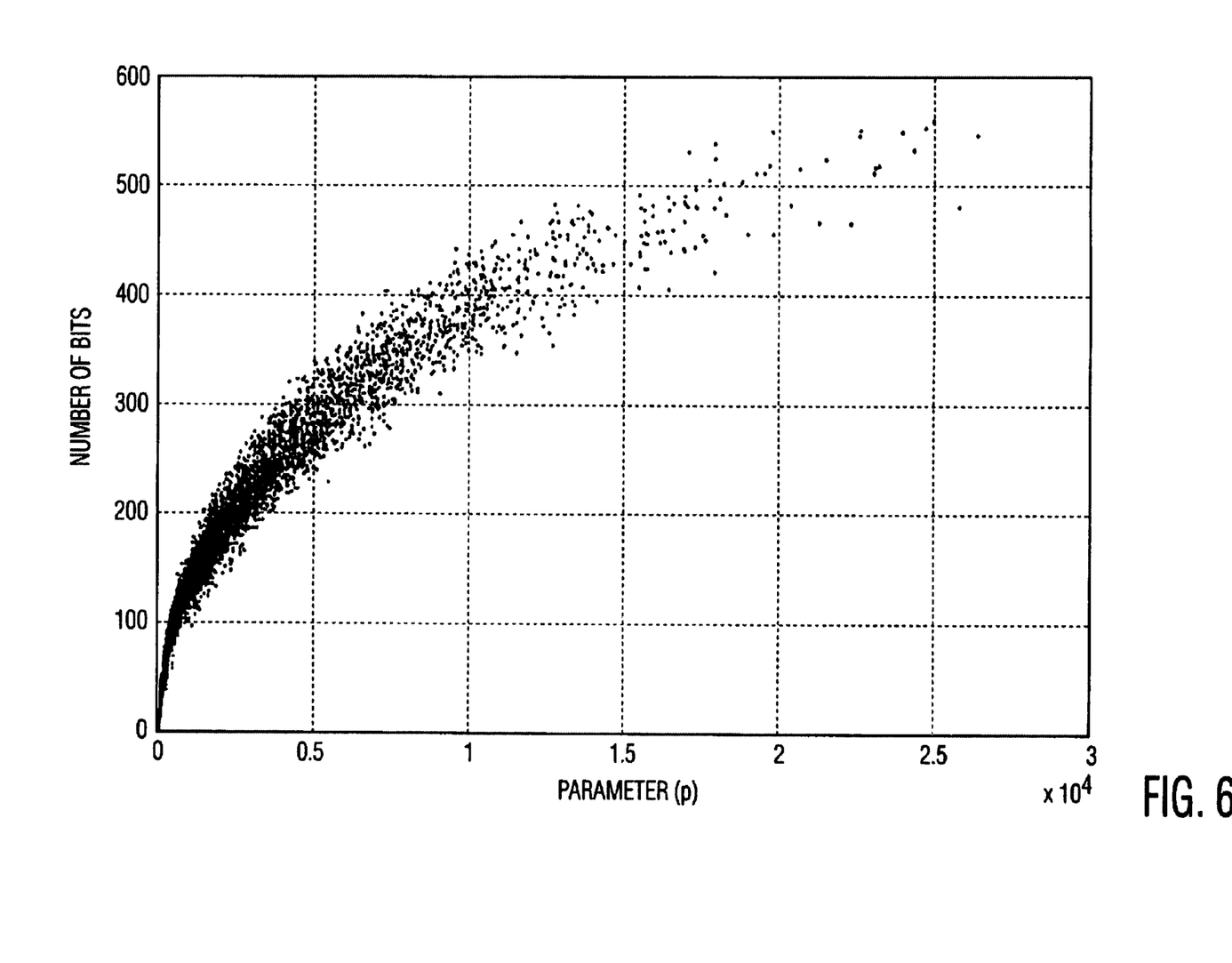
FIG. 6 is a correlation plot for the parameter described in connection with FIG. 5, depicting an apparent correlation between the VLC bit number and the parameter.

FIG. 6 is the correlation plot for the parameter P calculated in FIG. 5. In order to obtain the results presented in FIG. 6 and the other correlation plot figures that follow, the DCT data is first retrieved from a frame in an original DV clip ("Demo"). Next, those DCT blocks are coded with the specific quantization matrix in order to determine the DCT blocks' bit count. Then the parameter P is computed as described above. Each point in the figure represents a number of bits (vertical axis) vs. the parameter P (horizontal axis) of one DCT block. FIG. 6 shows an apparent correlation between the VLC bit number and the parameter. If the parameter P is fixed, for example at P=10000, the range of VLC bit number is quite large (about 100 bits). This translates to a prediction error as large as 50 bits, which is not satisfactory.

Figure 7:
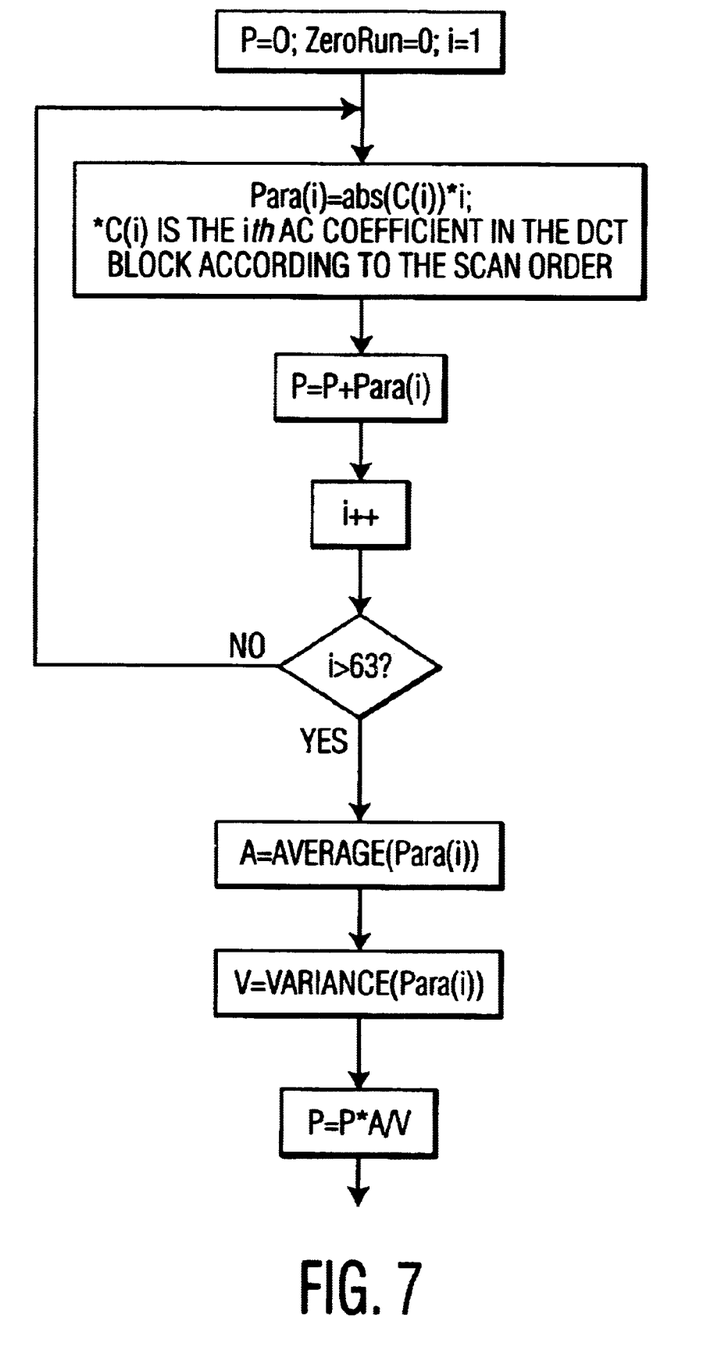
FIG. 7 is a modification of the scheme depicted in FIG. 5, obtained by taking into account variance.

In FIG. 7 the scheme is modified by taking into account a new factor; variance. The calculation shown in FIG. 7 multiplies the parameter calculated in FIG. 5 by the average of abs (C(i))*i for the 63 AC coefficients divided by the variance of abs (C(i))*i over the 63 AC coefficients. The concept behind the parameter calculation shown in FIG. 7 is that given the same P defined in FIG. 5, if there are just a few large coefficients (large variance), fewer bits are required than that in the case when there are many small coefficients (small variance).

Figure 8:
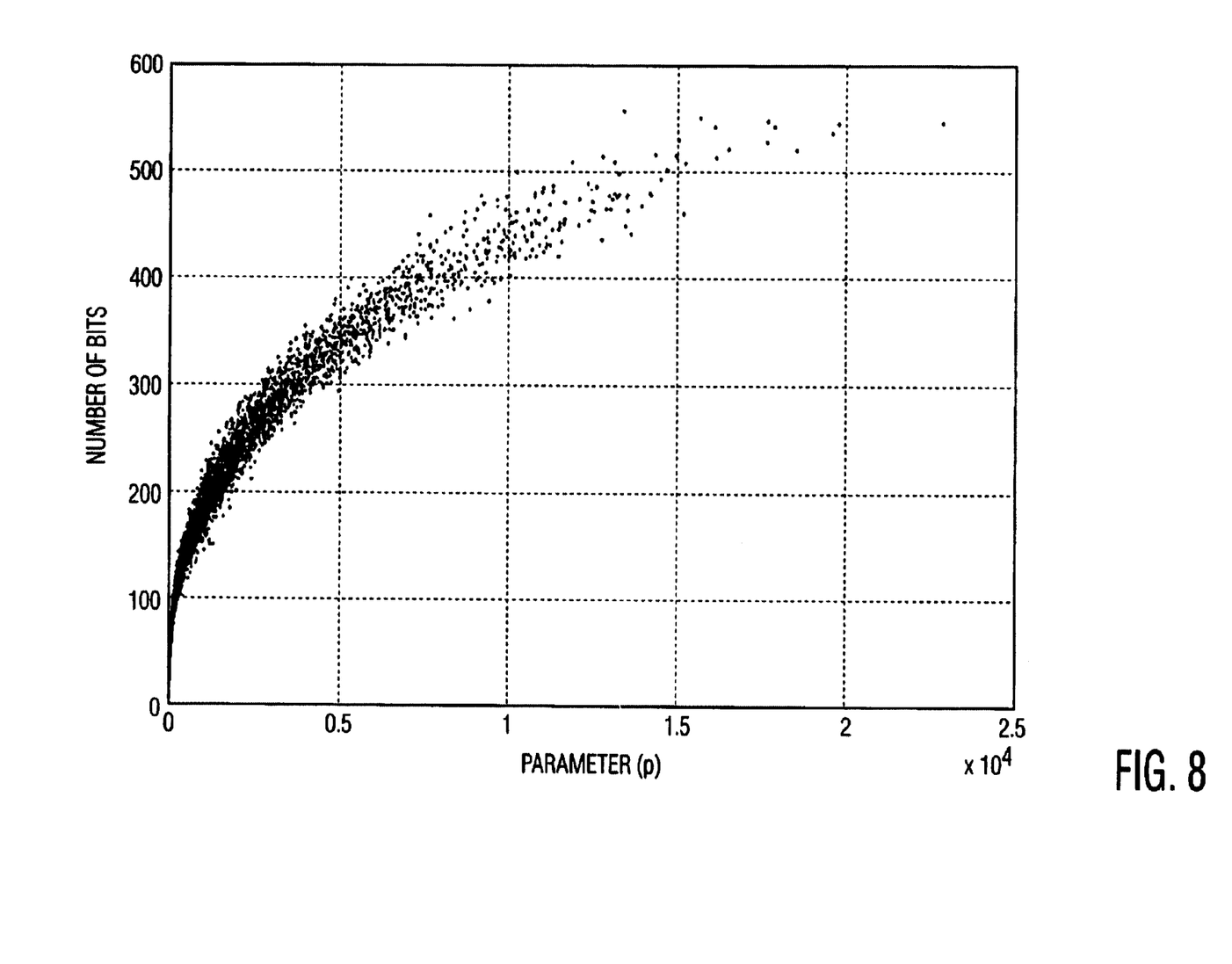
FIG. 8 is the correlation plot for the P defined in FIG. 7.

FIG. 8 is the correlation plot for the P defined in FIG. 7. The result depicted in the figure looks better than that shown in FIG. 6 when P is far from zero. The range of bit number for a fixed parameter is smaller than that in FIG. 6 when P is large, however, the range is still large for the P near to 0.

Figure 9:
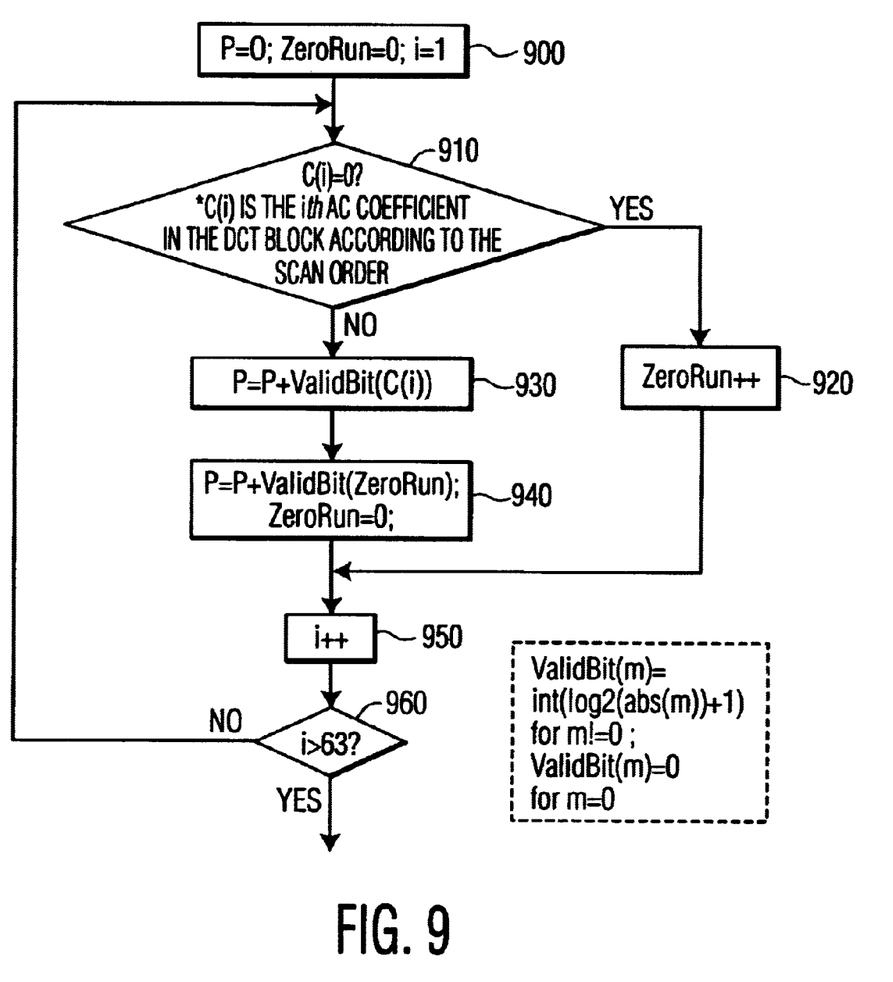
FIG. 9 is a modification of the scheme of FIG. 7, in which a correlation between P and the VLC bit number is used.

The absence of a strong correlation between P and the VLC bit number in the previous schemes led to the development of a third formulation of P as defined in FIG. 9. At step 900 of FIG. 9, the variables P, ZeroRun and i are initialized. At step 910, the process checks the coefficient C(i) to determine if it is equal to zero. If it is, control passes to step 920 which increments the variable ZeroRun. If C(i) is not equal to zero, step 930 accumulates the value ValidBit (C(i)) in the variable P. The function ValidBit(m) is defined as ValidBit(m)=int(log2(abs(m))+1 for m!=0, and ValidBit (m)=0 for m=0. Next, at step 940, the process accumulates ValidBit(ZeroRun) into the parameter P and sets ZeroRun to zero. At step 950, the index variable i is incremented and, at step 960, the process transfers control to step 910 unless the last AC coefficient value (i=63) has been processed.

The function ValidBit(m) actually is the position of the most significant non-zero bit of a binary number. For example, ValidBit(5)=ValidBit(101B)=3. Given v=ValidBit (m), the least significant v bits of m are its "valid bits". In this definition of P, a DCT block is scanned and its (run, amplitude) combinations are determined. P is the summation of the valid bit numbers of all the (run, amplitude) combinations.

One advantage of the above definition of P is that it can "code" the (run, amplitude) combinations by just packing their valid bits. Such "coding" is undecodable since it does not have the prefix free property; however, with regard to the number of bits, this coding scheme imitates the VLC coding in that both use fewer bits to represent smaller run and amplitude. Therefore, it is possible that the number of bits for our pseudo-coding scheme correlates well with that for the VLC coding scheme.

Figure 10:
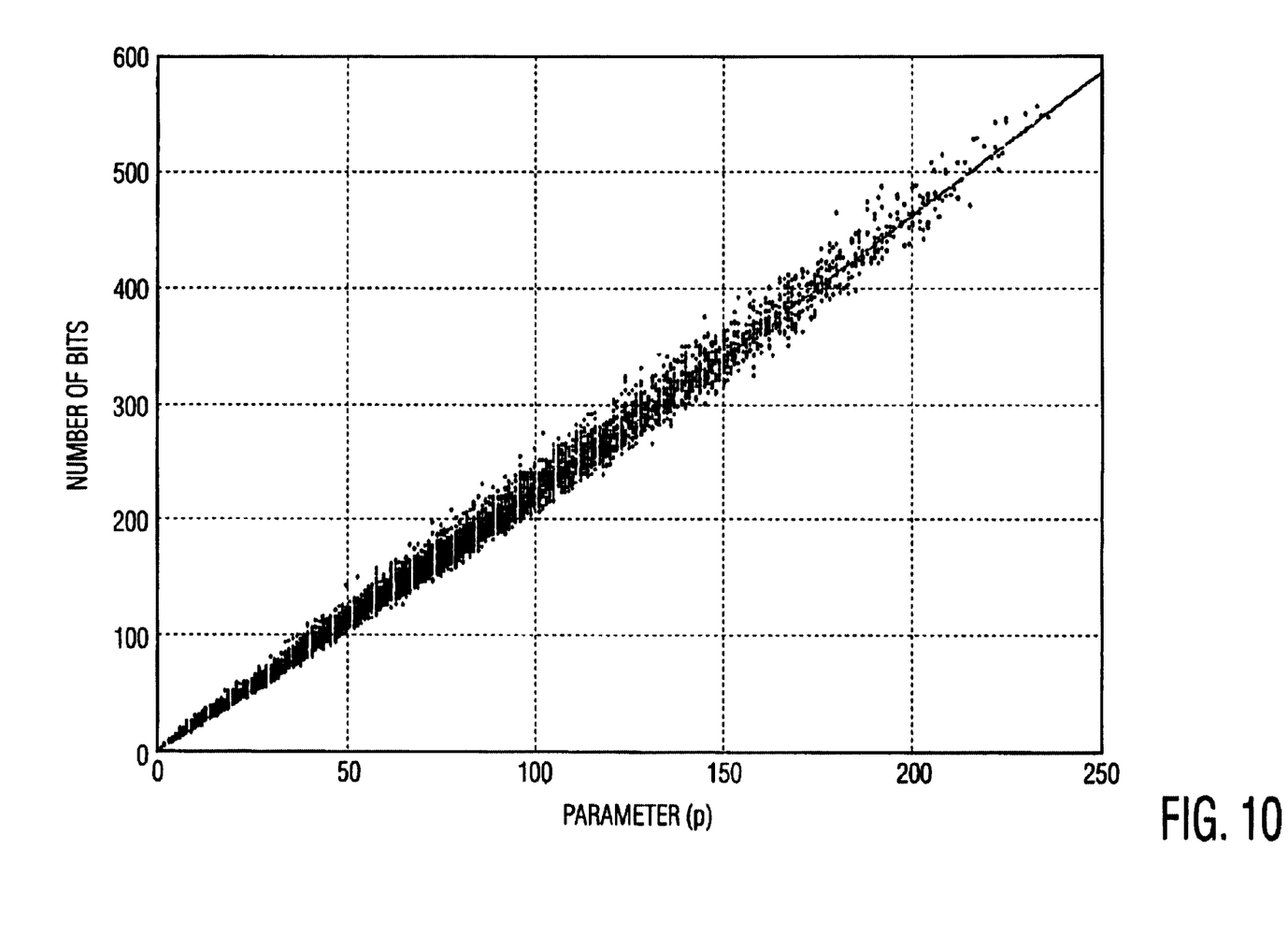
FIG. 10 is a correlation plot between the P defined above and the bits needed to code a DCT, with QMN=8, as applied to a frame from the video clip "Demo"

FIG. 10 shows the correlation plot between the P defined above and the bits needed to code a frame, with a quantization number matrix of QMN=8. As can be seen, the points are well approximated by a curve (which is the prediction model we will derive later), which means P is well correlated with the number of VLC bits. FIG. 10 shows the bits for the specific frame quantized with the specific quantization matrix. If another frame, or another quantization matrix is used the correlate between P and the number of bits remains good. Specifically, for all of the 9 quantization matrices the inventors have found a good correlation between P and the number of bits. For the same quantization matrix, different frames produce nearly identical correlation plots.

Figure 11:
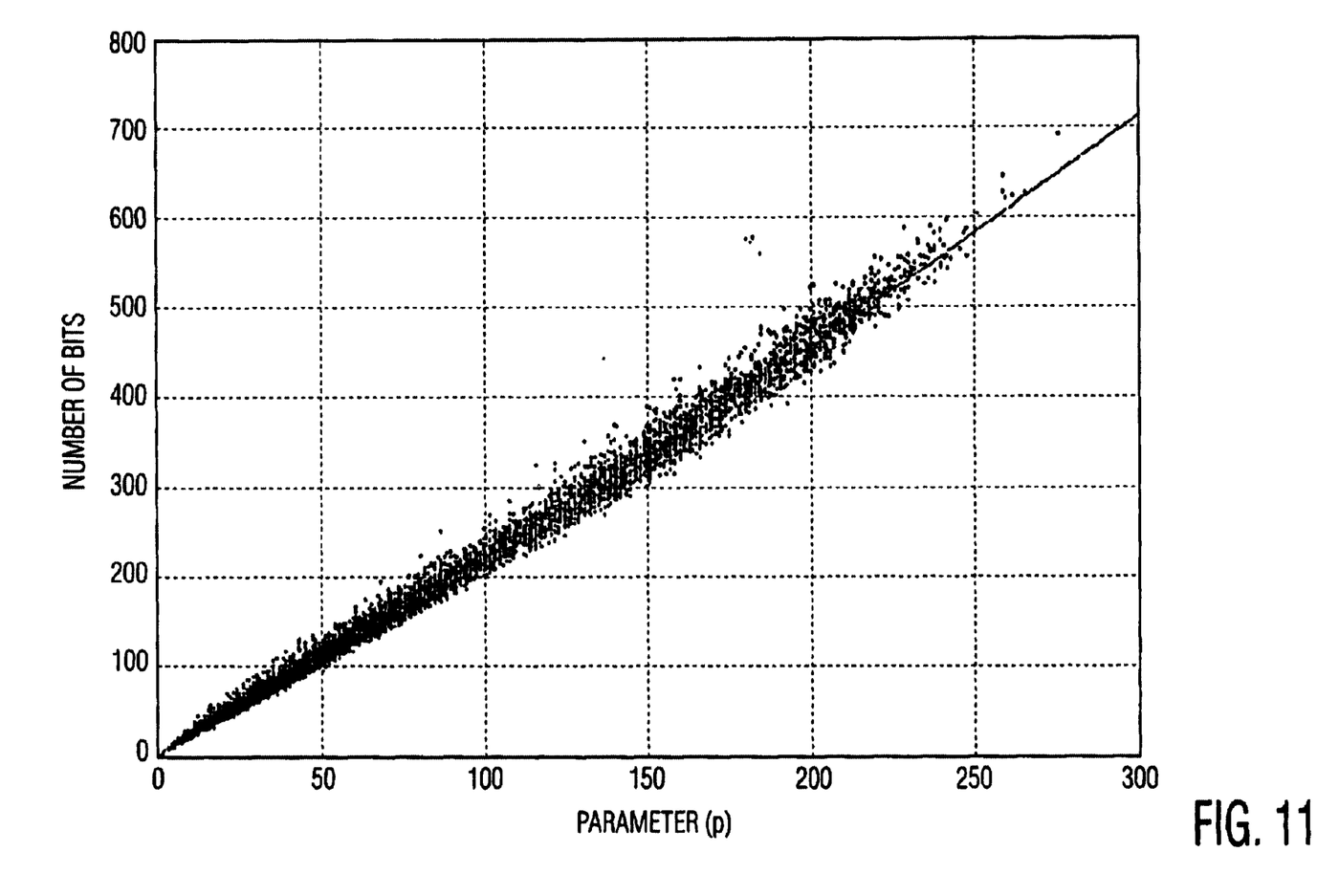
FIG. 11 is a computation on the a frame of the video clip "Mobile Calendar," but with a different quantization matrix (QMN=6)

If the same computation is performed on a frame from the famous "Mobile Calendar" clip with the same quantization matrix as used in obtaining result shown in FIG. 10, the correlation plot as shown in FIG. 11 is obtained.

FIG. 11 shows the correlation between P and the actual number of bits needed to code a DCT block-Mobile Calendar, quantization matrix 8. The same computation on the same frame from "Demo" but with a different quantization matrix (QMN=6) yields the correlation plot shown in FIG. 12.

With the strong correlation observed, it is possible to build an accurate prediction model for the number of VLC bits produced by coding a segment. As the correlation plot implies, the relationship is very close to the linear one. However, to have a more accurate model, we choose to establish a second order polynomial model. According to one exemplary embodiment of the invention, the higher order polynomial is used.

The proposed model is:

$$Be = Am_2 \cdot P^2 + Am_1 \cdot P + Am_0$$

where Be is the predicted bit number and m is the quantization matrix number (from 0 to 8). The values $Am_2$, $Am_1$ and $Am_0$ are the polynomial coefficients and P is the parameter defined previously. With this model in place, one can compute the parameter P for a DCT block once, then can use it repeatedly with different quantization matrices during the quantization number search in order to predict the number of bits. This is much more efficient than going through the whole coding process.

Figure 13:
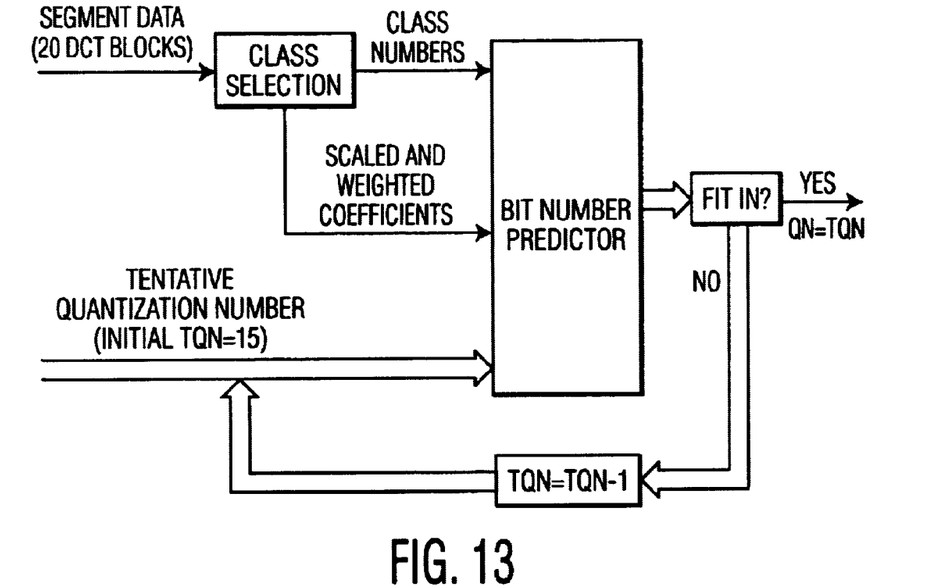
FIG. 13 is a diagram showing the quantizer selection process.
Figure 14:
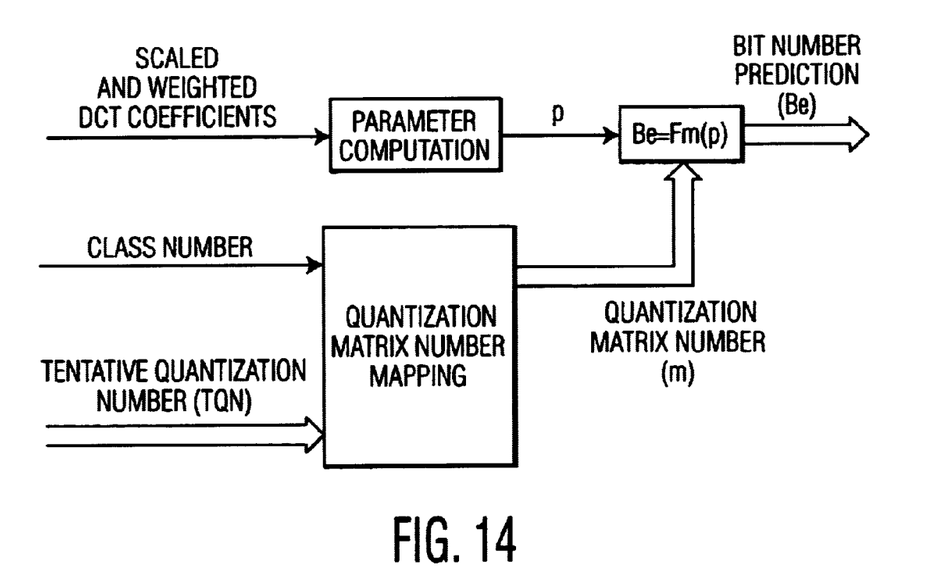
FIG. 14 is a diagram showing details for the bit number predictor, using a quadratic correlation model.

The diagram showing the quantizer selection process is depicted in FIG. 13. In FIGS. 13 and 14 double lines represent paths which may be executed more than once.

The quantizer selection of FIG. 13 still results in a search without the fine adjustment in the industrial encoder; just with a bit number predictor replacing the "coding simulator". Thus the inventive process does not go through the coding process to find out the VLC bit number.

The details for the bit number predictor are shown in FIG. 14, using the model of:

$$FM(P) = Am_2 \cdot P^2 + Am_1 \cdot P + Am_0$$

The bit number predictor operates on each DCT block and adds up the results to get the predicted bit number value for the DV Segment. The inventive scheme is tested on the two video clips, "demo" and "Mobile Calendar".

In this process, the DV50 clip (first generation) is transcoded into a high-quality I frame only MPEG2 stream with PSNR=50 db. After that, an independent MPEG2 to DV50 transcoder equipped with the bit number prediction algorithm, transcodes the MPEG2 stream back to DV50 (second generation) without knowing the previous coding decision in the first generation DV clip. The quality loss between the second generation DV and the MPEG streams is obtained by computing the PSNR numbers, shown in Table 5, and observing the results.

TABLE 5

| | PSNR | | |
|---|---|---|---|
| | Industrial Encoder without fine adjustment | Industrial Encoder with fine adjustment | New Scheme with Bit Number Prediction |
| Demo (800 frames) | 46.38 dB | 46.46 dB | 45.83 dB |
| Mobile Calendar (60 frames) | 42.64 dB | 43.36 dB | 41.15 dB |

From the results it can be seen that the difference between the two versions regarding the picture quality is marginal. It is noted that the "predictive transcoder" does not perform any fine adjustment. Visually the picture quality is also very satisfactory. Human eyes cannot detect any difference between the MPEG stream and the transcoded second generation DV stream.

Figure 12:
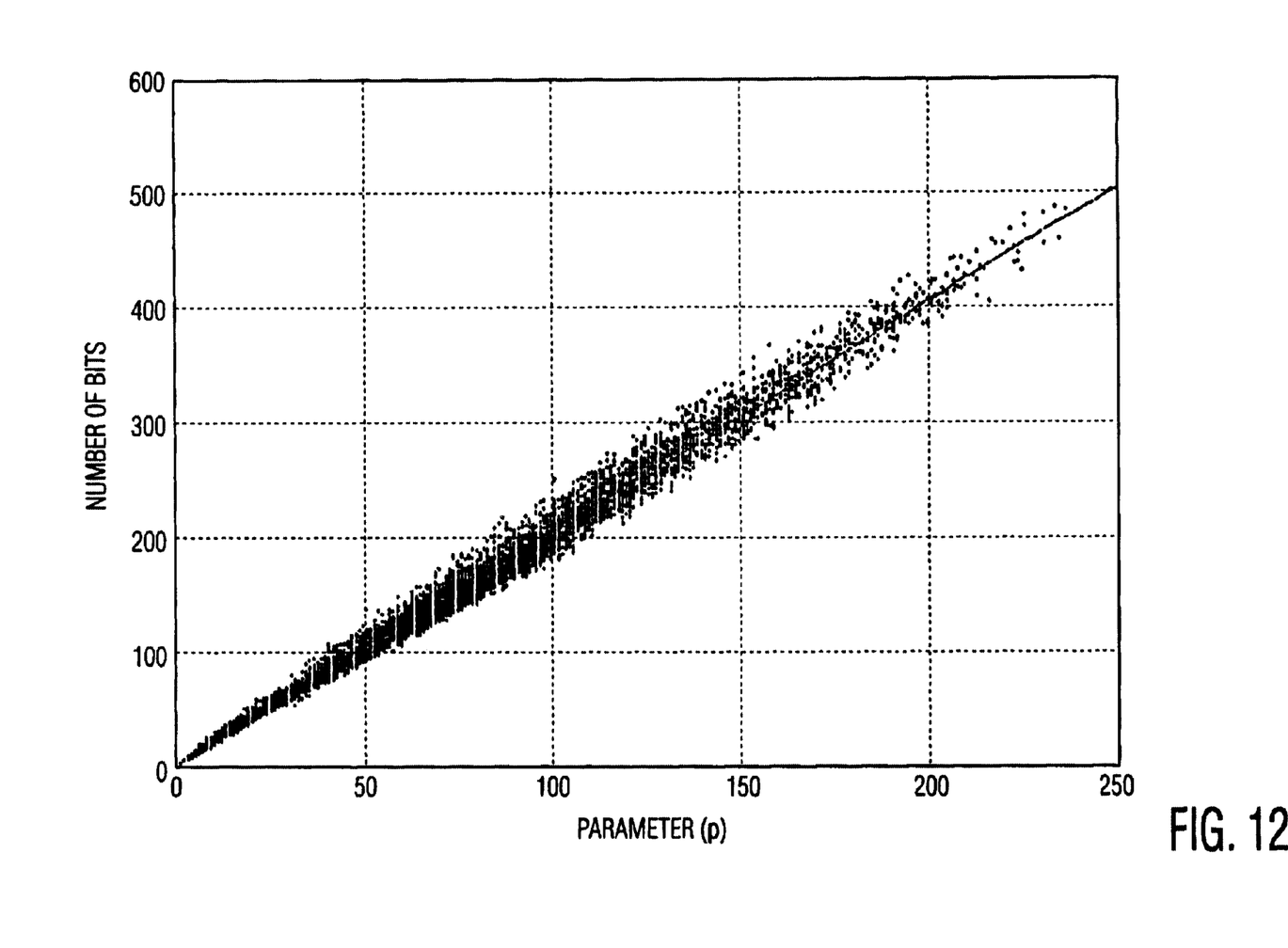
FIG. 12 is a correlation plot from the "Demo" video clip with the same quantization matrix as used in obtaining the result shown in FIG. 10.

It is contemplated that any of the bit-number predictor equations may be offset to insure that blocks encoded with the corresponding matrix will not overflow. With reference to FIGS. 10, 11 and 12, for example, rather than fitting the equation to the points, it may be fit the equation to a maximum quantization size for each corresponding value of the parameter P. Using this equation would reduce the possibility of bit-overflow when a selected quantization matrix is used to encode the block. It may be advantageous to preprocess the database to eliminate outliers before performing this function.

It is contemplated that the method may be practiced by computer program instructions that control a general purpose computer where the computer program instructions reside on a computer-readable carrier such as a magnetic or optical disk or a radio-frequency or audio-frequency carrier wave.

The present invention provides a scheme for the quantization number selection in the DV encoding process. The scheme has performance that is very close to the algorithm currently in use by the industry's encoders, but with much less computation complexity. This development can lead to a more power-efficient and cost-effective DV encoding/transcoding hardware or real-time software transcoder implementation.

What is claimed:

1. A heuristic-based method for converting variable frame size formatted video information to fixed frame size formatted video information using a DV format, the method comprising the steps of:

receiving a plurality of discrete cosine transform (DCT) blocks;

for each of a plurality of quantization matrixes performing the steps of:

calculating a parameter P and a variable length coding (VLC) bit count for the DCT blocks; and approximating the calculated bit count by a function of P;

determining one quantization matrix of the plurality of quantization matrixes to be used to encode DCT coefficients in each of the received DCT blocks by calculating the parameter P for the block and applying the calculated parameter P to the approximated function.

2. A heuristic-based method according to claim 1, wherein each of the DCT blocks includes a DC coefficient and a plurality of AC coefficients, and the step of calculating the parameter includes the steps of, for each of the plurality of DCT blocks:

calculating a product of each AC coefficient value and its coefficient index; and summing the calculated products over the block to obtain the parameter value.

3. A heuristic based method according to claim 2, further including the steps of calculating a mean value and variance value for the calculated products of the AC coefficients and their coefficient indexes and multiplying the parameter value by the mean value and dividing by the variance value to obtain a final parameter value.

4. A heuristic based method according to claim 1, wherein each of the DCT blocks includes a DC coefficient and a plurality of AC coefficients, and the step of calculating the parameter includes the steps of, for each of the plurality of DCT blocks:

calculating a number of bits to be encoded for each of the plurality of AC coefficients; and summing the calculated number of bits to produce the parameter value.

5. A heuristic based method according to claim 4, further including the steps of:

determining run-length values representing numbers of consecutive zero-valued AC coefficients in the block;

calculating a number of bits to be encoded for each run-length value;

and summing the numbers of bits to be encoded for each run-length value and the parameter value to obtain a final parameter value.

6. A heuristic-based method according to claim 1, wherein the step of approximating the calculated bit count by a function of P, approximates the bit count by an $n^{th}$ order polynomial in P.

7. A heuristic-based method according to claim 6, wherein the polynomial is a second order polynomial.

8. A heuristic-based method according to claim 1, further comprising:

receiving a tentative quantization matrix identifier for each of a plurality of DCT blocks;

using the polynomial and the tentative quantization matrix number to calculate a bit count for each of said DCT blocks; and if, for each DCT block, the calculated bit count is greater than a predetermined maximum value, selecting a quantization matrix which provides coarser quantization than the tentative quantization matrix to encode the DCT block.

9. A method for building a heuristic database to be used to convert variable frame size formatted video information to fixed frame size formatted video information using a DV format, the method comprising the steps of:

receiving a plurality of discrete cosine transform (DCT) blocks;

for each of a plurality of quantization matrixes calculating a parameter P and a variable length coding (VLC) bit count for each of the plurality of the DCT blocks; and storing an identifier of the quantization matrix, the parameter P and the VLC bit count as an ordered triplet in the heuristic database.

10. A heuristic-based method according to claim 9, wherein each of the DCT blocks includes a DC coefficient and a plurality of AC coefficients, and the step of calculating the parameter includes the steps of, for each of the plurality of DCT blocks:

calculating a product of each AC coefficient value and its coefficient index; and summing the calculated products over the block to obtain the parameter value.

11. A heuristic based method according to claim 10, further including the steps of calculating a mean value and variance value for the calculated products of the AC coefficients and their coefficient indexes and multiplying the parameter value by the mean value and dividing by the variance value to obtain a final parameter value.

12. A heuristic based method according to claim 9, wherein each of the DCT blocks includes a DC coefficient and a plurality of AC coefficients, and the step of calculating the parameter includes the steps of, for each of the plurality of DCT blocks:

calculating a number of bits to be encoded for each of the plurality of AC coefficients; and summing the calculated number of bits to produce the parameter value.

13. A heuristic based method according to claim 12, further including the steps of:
 determining run-length values representing numbers of consecutive zero-valued AC coefficients in the block;
 calculating a number of bits to be encoded for each run-length value;
 and summing the numbers of bits to be encoded for each run-length value and the parameter value to obtain a final parameter value.

14. A heuristic-based method for converting variable frame length formatted video information to fixed frame length formatted video information using a DV format, the approach comprising:
 generating a heuristic measure representing a predicted number of bits needed to encode a portion of the variable length formatted video information using a predetermined quantization matrix;
 comparing the generated heuristic measure to a predetermined maximum value; and
 selecting a quantization matrix having coarser quantization than the predetermined quantization matrix, for use in formatting the portion of the variable length formatted video information, if the compared heuristic measure is greater than the predetermined maximum value.

15. A heuristic-based method according to claim 14, wherein the step of generating the heuristic measure includes the steps of:
 calculating a parameter P for the portion of the variable length formatted video information; and
 applying a predetermined function to the parameter P to determine the heuristic measure, wherein the predetermined function is associated with the predetermined quantization matrix.

16. A heuristic-based method according to claim 14, wherein the portion of the variable length formatted video information includes a plurality of DCT coefficients, and the step of calculating the parameter includes the steps of:
 calculating a product of each DCT coefficient value and its coefficient index; and
 summing the calculated products over the block to obtain the parameter value.

17. A heuristic based method according to claim 16, further including the steps of calculating a mean value and variance value for the calculated products of the DCT coefficients and their coefficient indexes and multiplying the parameter value by the mean value and dividing by the variance value to obtain a final parameter value.

18. A heuristic-based method according to claim 14, wherein the portion of the variable length formatted video information includes a plurality of DCT coefficients, and the step of calculating the parameter includes the steps of:
 calculating a number of bits to be encoded for each of the plurality of DCT coefficients; and
 summing the calculated number of bits to produce the parameter value.

19. A heuristic based method according to claim 18, further including the steps of:
 determining run-length values representing numbers of consecutive zero-valued AC coefficients in the block;
 calculating a number of bits to be encoded for each run-length value;
 and summing the numbers of bits to be encoded for each run-length value and the parameter value to obtain a final parameter value.

20. A method for constructing a prediction model for converting variable frame video formatted video information to fixed frame video formatted video information, the method comprising the steps of:
 a) setting a parameter P to a first initial value, and setting an initial incremental value;
 b) receiving a block of DCT coefficients;
 c) selecting one DCT coefficient from the block of DCT coefficients;
 d) establishing a new value of P, ($P_n$), as a function of the previously established value of P, ($P_p$) and the selected DCT coefficient,
 e) repeating steps c) and d) until a last DCT coefficient from the block of DCT coefficients have been processed.

21. A method according to claim 20, wherein the step d) comprises the steps of:
 establishing a new value of P, ($P_n$), as a function of the previously established value of P, ($P_p$) and an incremented value of i, $P_n = F(P_p, i)$; and incrementing P P, and if the incremented value of i is not greater than the predetermined value again determining a new value for the parameter P, using the last determined value of P as the previous value for P, ($P_p$).

22. A method according to claim 21, comprising selecting the predetermined bit value at a value of 63.

23. Heuristic-based approach for converting variable frame video formatted video information to fixed frame video formatted video information, the approach comprising:
 receiving a quantizer number and supplying the quantizer number to a correlation database;
 receiving a DCT coefficient for the correlation database;
 extracting at least one parameter value from the DCT coefficient for the correlation database and providing said one value to the correlation database;
 providing a correlation database output to a prediction model;
 receiving a quantizer number and supplying the quantizer number for the prediction model;
 extracting at least one parameter value P from the DCT;
 setting the parameter P to a first initial value, and setting an initial incremental value;
 for a DCT block, establishing a new value of P, ($P_n$), based on the previously established value of P, ($P_p$);
 incrementally changing i in order to establish an incremented value of i;
 in cases where said predetermined number for the incremented value of i is less than a predetermined bit value, determining if the incremented value of i exceeds a predetermined number; and
 if the incremented value of i is greater than the predetermined value, accepting the definition of the parameter P, and if the incremented value of i is not greater than the predetermined value again determining a new value for the parameter P, using the last determined value of P as the previous value for P, ($P_p$).

24. Method of claim 23, comprising selecting the predetermined bit value at a value of 63.

25. Method of claim 23, wherein the new value of P, ($P_n$), based on the previously established value of P, ($P_p$) is established, according to $$P_n=P_p+abs(C(i))*i, \text{ where}$$

C(i) is the $i^{th}$ AC coefficient in the DCT block for which P is being established and $P_n$ and $P_p$ are the new value of P and previous value of P, respectively.

26. Method of claim 23, wherein the new value of P, ($P_n$), based on the previously established value of P, ($P_p$) is established, according to $$Para(i)=abs(C)(i))*i, \text{ where}$$

C(i) is the $i^{th}$ AC coefficient in the DCT block for which P is being established; and incrementing P where $P_n=P_p+Para(i)$ where $P_n$ and $P_p$ are the new value of P and previous value of P, respectively.

27. Method of claim 23, wherein the new value of P, ($P_n$), based on the previously established value of P, ($P_p$) is established, according to determining if C(i) is equal to zero, where
C(i) is the i AC coefficient in the DCT block for which P is being established, and incrementing a ZeroRun value if C(I) is equal to zero;

establishing a new value of the parameter P, $P_n$, as:

$$P_n=P_p+ValidBit(C(i))+ValidBit(ZeroRun);$$

where, $ValidBit(m)=int(log2(abs(m))+1$ for $m \neq 0$, and $ValidBit(m)=0$ for $m=0$;

incrementing i, where
$P_n$ and $P_p$ are the new value of P and previous value of P, respectively.

28. A computer readable carrier that includes computer program instructions which control a general purpose computer to perform a heuristic-based method for converting variable frame size formatted video information to fixed frame size formatted video information using a DV format, the method comprising the steps of:

receiving a plurality of discrete cosine transform (DCT) blocks;

for each of a plurality of quantization matrixes performing the steps of:
calculating a parameter P and a variable length coding (VLC) bit count for the DCT blocks; and
approximating the calculated bit count by a function of P;

determining one quantization matrix of the plurality of quantization matrixes to be used to encode DCT coefficients in each of the received DCT blocks by calculating the parameter P for the block and applying the calculated parameter P to the approximated function.

* * * * *